United States Patent Office 3,597,242
Patented Aug. 3, 1971

3,597,242
FLAME RETARDANT CELLULOSE ACETATE ARTICLES
Joseph Di Pietro, Alma, Mich., and Willard C. Brinegar, Charlotte, N.C., assignors to Celanese Corporation, New York, N.Y.
No Drawing. Continuation of application Ser. No. 538,955, Mar. 31, 1966. This application Aug. 25, 1969, Ser. No. 852,903
Int. Cl. C09d 5/18
U.S. Cl. 106—15                                        14 Claims

ABSTRACT OF THE DISCLOSURE

A composition comprising cellulose acetate, a halogenated paraffin and a synergistic agent selected from the group consisting of phenyl phosphates, 2,5-dimethyl-2,5-di(5-butyl-5-peroxy)hexane, t-butyl-hydroperoxide, nitroso benzene and phenyl hydrazine.

---

This application is a continuation of application Ser. No. 538,955, filed Mar. 31, 1966 now abandoned.

This invention relates to improved flame retardant secondary cellulose acetate articles, and a process of producing them.

Secondary cellulose acetate has found wide commercial acceptance as man-made fibers for textiles, non-woven products and the like. While these products are for the most part suitable in the end-use application for which they are utilized, there are uses for which increased flame retardance would be very desirable. Such uses are wearing apparel and home furnishings such as drapes and upholstery fabrics.

It is an object of this invention to provide shaped articles of secondary cellulose acetate having increased flame retardance.

It is a further object of this invention to provide fiber products of secondary cellulose acetate which do not support combustion.

It is a still further object of this invention to impart the property of flame retardance to shaped articles of secondary cellulose acetate without serious sacrifice of their other favorable properties such as mechanical and dyeing properties.

In accordance with this invention, there is incorporated into an organic solvent solution of secondary cellulose acetate a minor amount of a halogenated paraffin and a minor amount of a synergistic agent selected from the group consisting of phenyl phosphates, t-butyl-hydroperoxide, 2,5-dimethyl-2,5-di(t-butyl-5-peroxy) hexane, nitroso benzene and phenyl hydrazine.

The organic solvent solutions of secondary cellulose acetate to which this invention may be applied are conventional spinning or casting solutions for the production of filaments and films respectively which generally contain about 10 to 30 percent by weight of secondary cellulose acetate. The solvent used is preferably acetone but other solvents may be used such as methylene chloride, chloroform, and the like.

The halogen in the halogenated paraffin contemplated by this invention is preferably chlorine. However, a paraffin halogenated with other halogens such as bromine, fluorine, or iodine may also be used. The halogenated paraffin is composed of molecules having an average number of carbon atoms of at least six and is generally a liquid or wax at room temperature having a boiling point of at least 150° C., preferably well above 200° C. at atmospheric pressure, a viscosity at 25° C. of at least 10 poises, and a halogen content of about 30 to 70 percent by weight of the total halogenated paraffin. The halogenated paraffin may be, for example, a chlorinated paraffin wax or a chlorinated low molecular weight polyethylene.

The halogenated paraffin is used in the solution of secondary cellulose acetate in an amount of about 2 to 30, preferably in an amount of 2 to 15 percent by weight of the secondary cellulose acetate.

The synergistic agent is used in an amount of 0.3 to 5.0%, preferably 0.5 to 3.0%, based on the weight of the cellulose acetate.

The phenylphosphates suitable as synergistic agents in this invention are preferably devoid of halogen, although halogenated phenylphosphates can also be used.

The total amount of halogenated paraffin and synergistic agent is almost always less than the amount of halogenated paraffin which would be necessary to produce an equivalent self-extinguishing article, e.g., fiber or film of secondary cellulose acetate, when used alone, i.e., without any synergistic agent.

As is well known in the art, secondary cellulose acetate is a cellulose acetate containing about 54 to 56% of acetyl groups calculated as combined acetic acid. Thus, secondary cellulose acetate may be distinguished from cellulose triacetate which generally contains at least about 59%, preferably at least 61% of acetyl groups calculated as combined acetic acid.

In addition to the flame retardant agents of this invention, the organic solvent solution of secondary cellulose acetate may contain other modifying components, e.g., pigments for dulling or coloring the yarn or film, plasticizers, stabilizers, etc.

The following examples further illustrate the invention:

EXAMPLE I

In a spinning solution in acetone of 26.9 weight percent of secondary cellulose acetate having an acetyl value of about 54.9% calculated as combined acetic acid were dissolved 5% based on the weight of cellulose acetate of a chlorinated paraffin wax having a chlorine content of about 48 to 52% by weight, a viscosity at 25° C. of about 430 to 620 poises, a specific gravity at 25° C. of about 1.26, an atmospheric boiling point well above 200° C. and sold by the Hercules Powder Company under the trademark "Clorafin 50," and 2½% based on the weight of the secondary cellulose acetate of triphenyl phosphate. To an identical solution was added 5% of triphenyl phosphate. These modified spinning solutions were extruded in a downward direction through a spinneret containing 40 holes each 36 microns in diameter into a spinning column of 7 inches in diameter and 7 feet long containing air traveling in an upward direction. The temperature of th espinneret face was 80° C. and the average air temperature in the spinning column was 50° C. The take-up speed of the resulting yarns were 100 meters per minute.

The resulting secondary cellulose acetate yarn containing 5% chlorinated paraffin had a total denier of 153, a tenacity of 1.22 grams per denier, an elongation of 28.1 percent and was self-extinguishing when subjected to Flame Test I described below. The yarns containing 5% triphenyl phosphate burned when subjected to Flame Test I.

EXAMPLE II

The procedure of Example I was repeated except that the chlorinated paraffin wax was used in an amount of 2% based on the weight of the cellulose acetate and the triphenyl phosphate was replaced by 1% based on the weight of cellulose acetate of o-phenylphenyl bisphenyl phosphate.

The resulting yarn had a total denier of 154, a tenacity of 1.19 grams per denier, an elongation of 30.6% and was self-extinguishing when subjected, to Flame Test I described below.

Yarn containing 7% o-phenylphenyl bisphenyl phosphate was prepared in a like manner. This yarn had a total denier of 155, a tenacity of 1.11 grams per denier, an elongation of 25.6% and burned when subjected to Flame Test I.

EXAMPLE III

The procedure of Example I was repeated except that the solutions contained 20% by weight of secondary cellulose acetate, 4% of the chlorinated paraffin based on the weight of cellulose acetate, and 1% of triphenyl phosphate based on the weight of cellulose acetate, and instead of extruding the solution through the orifices of a spinneret, it was cast into a film on a glass plate using a doctor blade 6⅛" long by 0.020" of clearance. The film was dried in a vacuum oven at 50° C. until free from solvents.

When the film was subject to Flame Test II described below, it was found to be self-extinguishing.

Film containing 5% "Clorafin 50" was prepared in a like manner. The resulting film burned when subjected to Flame Test I.

EXAMPLE IV

The procedure of Example III was repeated except that the solution contained in addition to the secondary cellulose acetate 4% based on the weight of the cellulose acetate of a chlorinated paraffin wax containing 40 to 43.5% by weight of chlorine and having a viscosity at 25° C. of 26 to 39 poises and a specific gravity at 25° C. of 1.16, sold by Hercules Powder Company under the trademark "Clorafin 40," and 1% based on the weight of the cellulose acetate of o-phenylphenyl bisphenyl phosphate. The resulting film was self-extinguishing when subjected to Flame Test II described below.

Film containing 5% "Clorafin 40" was prepared in a like manner. The resulting film burned when subjected to Flame Test I described below.

EXAMPLE V

The procedure of Example III was repeated except that the triphenyl phosphate was replaced by 1% based on the weight of the cellulose acetate of 2,5-dimethyl-2-5-di (t-butyl-5-peroxy) hexane.

The resulting film was self-extinguishing when subjected to Flame Test II described below.

Film containing 5% 2,5-dimethyl-2,5-di(t-butyl-5-peroxy) hexane was prepared in a like manner. The resulting film burned when subjected to Flame Test I described below.

EXAMPLE VI

The procedure of Example II was followed except that the triphenyl phosphate was replaced by 1% based on the weight of cellulose acetate of t-butyl hydroperoxide.

The resulting film was self-extinguishing when subjected to Flame Test II described below.

Film containing 5% t-butyl hydroperoxide was prepared a like manner. The resulting film burned when subjected to Flame Test I described below.

EXAMPLE VII

The procedure of Example III was repeated except that the triphenyl phosphate was replaced by 1% based on the weight of cellulose acetate of nitrosobenzene.

The resulting film was self-extinguishing when subjected to Flame Test II described below.

Film containing 5% nitrosobenzene was prepared in a like manner. The resulting film burned when subjected to Flame Test I described below.

EXAMPLE VIII

The procedure of Example III was repeated except that the solution contained only 10% by weight of secondary cellulose acetate, 2% by weight of the cellulose acetate of the chlorinated paraffin wax, and 1% by weight of the cellulose acetate of phenyl hydrazine, the solution was cast into film by means of a doctor blade 6½" long and 0.050" thick, and the resulting film was air-dried at room temperature until no residual solvent odor was noticeable.

The film was found to be self-extinguishing when subjected to Flame Test II described below.

Film containing 10% phenyl hydrazine was prepared in a like manner. The resulting film burned when subjected to Flame Test II described below.

It has been found that further beneficial effects are obtained and the weight of the non-volatile halogenated paraffin may be reduced if a second synergistic agent is employed consisting of a halogenated alkane containing up to 4 carbon atoms and at least 10% by weight of halogen. Any halogen may be used but bromine and chlorine are preferred. The second synergistic agent is used in an amount of 0.5 to 3.0% based on the weight of cellulose acetate.

The following examples illustrate the use of a second synergistic agent:

EXAMPLE IX

The procedure of Example III was followed except that only 2.5% based on the weight of cellulose acetate of chlorinated paraffin wax was employed and the solution also contained, in addition to the triphenyl phosphate, 2.5% by weight of the cellulose acetate of tetrabromoethane.

The resulting film was self-extinguishing when subjected to Flame Test II described below.

EXAMPLE X

The procedure of Example IX was followed except that the "Clorafin 50" was replaced by "Clorafin 40." Similar results are obtained.

EXAMPLE XI

The procedure of Example IX is followed except that only 0.5% of triphenyl phosphate and 1% of tetrabromoethane based on the weight of cellulose acetate are employed. The resulting film is self-extinguishing when subjected to Flame Test II described below.

Flame Test I was carried out as follows:

The yarn was knitted into a hose leg or a film was cast, a six- to eight-inch section of which was suspended vertically from a support placed in an area essentially free from direct air drafts. The freely-hanging lower edge of the fabric or film was ignited with a luminous flame from either a Bunsen burner or a paper safety match. After the initial ignition of the fabric or film, the flame was removed and the burning characteristics of the fabric were observed. The sample was considered to be self-exinguishing if the flame was repeatedly extinguished after several ignitions of the same fabric or film sample.

Flame Test II was carried out as follows:

Three 1" by 4" strips of the film were held horizontally by means of tweezers and ignited with a luminous flame from a Bunsen burner. The sample was considered to be self-extinguishing if the film usually appeared difficult to ignite and the flame was repeatedly extinguished upon removal of the ignition source.

In the test of the film of Example VIII, three film samples about 6" by 1" in size were cut from the larger cast film and the samples were held vertically and ignited to the flame from a safety match. Again, the sample was considered to be self-extinguishing if film appeared difficult to ignite and was repeatedly extinguished upon removal of the ignition source.

Although the foregoing disclosure of the invention primarily describes fibers and films as shaped articles, the compositions of the invention may also be used to form flame-retardant molded articles. Thus, the organic solvent solution of cellulose acetate and additives may be precipitated to form flake which may subsequently be injection or compression molded.

It is to be understood that the foregoing detailed description is given merely by way of illustration and that many variations may be made therein without departing from the spirit of our invention.

The embodiments of the invention in which an exclusive property or privilege is claimed are defined as follows:

1. A composition consisting essentially of secondary cellulose acetate containing, based on the weight of said cellulose acetate, from about 2% to 30% of a halogenated paraffin composed of molecules having an average number of carbon atoms of at least six and having a boiling point of at least 150° C. at atmospheric pressure and a halogen content of at least about 30% by weight, and from about 0.3% to 5% of a synergistic agent selected from the group consisting of phenyl phosphates, 2,5-dimethyl-2,5-di(t-butyl-5-peroxy)hexane, t-butyl hydroperoxide, nitrosobenzene, and phenyl hydrazine.

2. The product of claim 1 wherein said halogenated paraffin is a chlorinated paraffin wax.

3. The product of claim 1 wherein said synergistic agent is a phenyl phosphate.

4. The product of claim 3 wherein said aryl phosphate is o-phenylphenyl bisphenyl phosphate.

5. The product of claim 3 wherein said aryl phosphate is triphenyl phosphate.

6. An organic solvent solution of secondary cellulose acetate suitable for forming into shaped articles consisting essentially of, based on the weight of said cellulose acetate, from about 2% to 30% of a halogenated paraffin composed of molecules having an average number of carbon atoms of at least six and having a boiling point of at least 150° C. at atmospheric pressure, and a halogen content of at least about 30% by weight, and from about 0.5% to 3% of a synergistic agent selected from the group consisting of phenyl phosphates, 2,5-dimethyl-2,5-di(t-butyl-5-peroxy) hexane, t-butyl hydroperoxide, nitroso benzene, and phenyl hydrazine.

7. The solution of claim 6 wherein the organic solvent is acetone, the halogenated paraffin is chlorinated paraffin wax, and the synergistic agent is a phenyl phosphate.

8. A shaped article comprising the composition of claim 1.

9. The product of claim 8 wherein said shaped article is a fiber.

10. The product of claim 8 wherein said shaped article is a film.

11. The composition of claim 1 additionally including from about 0.5 to 3.2 percent of a second synergistic agent selected from the group consisting of halogenated alkanes containing up to 4 carbon atoms and at least 10 percent by weight of halogen.

12. The composition of claim 11 wherein said halogen is bromine or chlorine.

13. The solution of claim 6 additionally including about 0.5 to 3.0 percent of a second synergistic agent selected from the group consisting of halogenated alkanes containing up to 4 carbon atoms and at least 10 percent by weight of halogen.

14. The solution of claim 13 wherein the halogen is bromine or chlorine.

References Cited

UNITED STATES PATENTS

| | | | |
|---|---|---|---|
| 2,028,715 | 1/1936 | Hanson | 117—136 |
| 2,330,251 | 9/1943 | Taylor | 117—136 |
| 3,001,885 | 9/1961 | Ehrlich | 106—190 |
| 2,669,521 | 2/1954 | Bierly | 106—15 |

MORRIS LIEBMAN, Primary Examiner

T. MORRIS, Assistant Examiner

U.S. Cl. X.R.

106—177; 252—8.1